United States Patent
Brown et al.

(10) Patent No.: US 10,459,834 B2
(45) Date of Patent: *Oct. 29, 2019

(54) RUN TIME AND HISTORICAL WORKLOAD REPORT SCORES FOR CUSTOMER PROFILING VISUALIZATION

(71) Applicant: International Business Machines Corporation, Armonk, NY (US)

(72) Inventors: Thomas R. Brown, Hyde Park, NY (US); Thomas W. Conti, Poughkeepsie, NY (US); Kyle R. Moser, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,129

(22) Filed: Feb. 8, 2017

(65) Prior Publication Data

US 2018/0004647 A1 Jan. 4, 2018

Related U.S. Application Data

(63) Continuation of application No. 15/197,828, filed on Jun. 30, 2016.

(51) Int. Cl.
*G06F 16/245* (2019.01)
*G06F 7/08* (2006.01)
*G06F 11/36* (2006.01)
*G06F 16/2457* (2019.01)

(52) U.S. Cl.
CPC ............ *G06F 11/3692* (2013.01); *G06F 7/08* (2013.01); *G06F 16/2457* (2019.01); *G06F 16/24578* (2019.01)

(58) Field of Classification Search
None
See application file for complete search history.

(56) References Cited

U.S. PATENT DOCUMENTS

| 5,881,238 A | 3/1999 | Aman et al. |
| 6,167,427 A | 12/2000 | Rabinovich et al. |
| 6,351,775 B1 | 2/2002 | Yu |

(Continued)

OTHER PUBLICATIONS

List of IBM Patents or Patent Applications Treated As Related (Appendix P), Filed Apr. 18, 2017, 2 pages.

(Continued)

*Primary Examiner* — Isaac T Tecklu
(74) *Attorney, Agent, or Firm* — Cantor Colburn LLP; William Kinnaman

(57) ABSTRACT

Aspects of the present invention include a method, system and computer program product for providing automated run time and historical test workload report scoring. The method includes caching, by a processor, historical data relating to a customer workload; and caching, by the processor, data relating to an active workload test. The method also includes determining, by the processor, one or more statistical measures between the historical data relating to a customer workload and the data relating to an active workload test; generating, by the processor, one or more workload report scores based on the statistical measures; and displaying, by the processor, the one or more workload report scores.

7 Claims, 5 Drawing Sheets

(56) References Cited

U.S. PATENT DOCUMENTS

| | | | |
|---|---|---|---|
| 6,981,180 | B1 | 12/2005 | Bailey et al. |
| 7,003,504 | B1 | 2/2006 | Angus et al. |
| 7,080,378 | B1 | 7/2006 | Noland et al. |
| 7,475,157 | B1 | 1/2009 | Tormasov |
| 7,561,988 | B2 | 7/2009 | Matsunaga et al. |
| 7,720,955 | B1 | 5/2010 | Kelly et al. |
| 7,860,097 | B1 | 12/2010 | Lovett et al. |
| 8,024,615 | B2 | 9/2011 | Tarta |
| 8,417,715 | B1 | 4/2013 | Bruckhaus et al. |
| 8,781,977 | B1 | 7/2014 | Huberman et al. |
| 8,850,270 | B2 | 9/2014 | Heiper et al. |
| 9,021,447 | B2* | 4/2015 | Krajec .............. G06F 11/3636 717/128 |
| 9,210,141 | B2* | 12/2015 | Anderson ............ H04L 9/3213 |
| 9,317,407 | B2 | 4/2016 | Sabin et al. |
| 9,727,448 | B1 | 8/2017 | Seibert, Jr. et al. |
| 9,846,881 | B2 | 12/2017 | Greene et al. |
| 10,019,167 | B2 | 7/2018 | Gray |
| 2001/0013008 | A1 | 8/2001 | Waclawski |
| 2002/0156663 | A1 | 10/2002 | Weber et al. |
| 2002/0170022 | A1 | 11/2002 | Shirai et al. |
| 2004/0044744 | A1 | 3/2004 | Grosner et al. |
| 2005/0149532 | A1* | 7/2005 | Hubbard .................. G06F 7/00 |
| 2005/0187990 | A1 | 8/2005 | Pace |
| 2006/0095311 | A1 | 5/2006 | Thompson |
| 2007/0022426 | A1 | 1/2007 | Steinder et al. |
| 2007/0276871 | A1 | 11/2007 | Fu et al. |
| 2008/0005707 | A1* | 1/2008 | Papanikolaou ..... G06F 17/5009 702/81 |
| 2008/0028409 | A1 | 1/2008 | Cherkasova |
| 2008/0189350 | A1 | 8/2008 | Vasa et al. |
| 2012/0095956 | A1 | 4/2012 | Xiong et al. |
| 2012/0110589 | A1 | 5/2012 | Ghosh et al. |
| 2012/0131104 | A1 | 5/2012 | Beaven et al. |
| 2012/0297238 | A1* | 11/2012 | Watson ................ G06F 9/5088 714/4.11 |
| 2013/0007126 | A1 | 1/2013 | Ziemann |
| 2013/0073473 | A1 | 3/2013 | Heath |
| 2013/0162444 | A1 | 6/2013 | Boulanger et al. |
| 2013/0185021 | A1 | 7/2013 | Addison et al. |
| 2013/0185433 | A1* | 7/2013 | Zhu ...................... H04L 67/303 709/226 |
| 2013/0212264 | A1 | 8/2013 | Troppens et al. |
| 2014/0033055 | A1 | 1/2014 | Gardner et al. |
| 2014/0047095 | A1* | 2/2014 | Breternitz ............. G06F 9/5072 709/224 |
| 2014/0047272 | A1* | 2/2014 | Breternitz ........... G06F 11/3495 714/32 |
| 2014/0109002 | A1 | 4/2014 | Kimball |
| 2014/0258987 | A1* | 9/2014 | Zhou ................... G06F 11/3692 717/126 |
| 2014/0337429 | A1 | 11/2014 | Asenjo et al. |
| 2014/0344787 | A1 | 11/2014 | Cochrane et al. |
| 2015/0032691 | A1 | 1/2015 | Hall et al. |
| 2015/0046363 | A1 | 2/2015 | McNamara et al. |
| 2015/0113162 | A1 | 4/2015 | Chan et al. |
| 2015/0161385 | A1* | 6/2015 | Gounares ................ G06F 21/54 726/25 |
| 2015/0317337 | A1 | 11/2015 | Edgar |
| 2015/0363348 | A1 | 12/2015 | Haynes |
| 2016/0188370 | A1 | 6/2016 | Razin et al. |
| 2016/0224392 | A1 | 8/2016 | Clarke et al. |
| 2016/0231999 | A1 | 8/2016 | Holler et al. |
| 2016/0357660 | A1* | 12/2016 | Dean .................. G06F 11/3692 |
| 2016/0359683 | A1* | 12/2016 | Bartfai-Walcott .......................... H04L 41/5009 |
| 2016/0381129 | A1* | 12/2016 | Barsness ............... G06F 9/5083 709/226 |
| 2017/0250885 | A1 | 8/2017 | Donovan |
| 2017/0315902 | A1* | 11/2017 | Moretto ............. G06F 11/3664 |
| 2018/0284756 | A1 | 10/2018 | Cella et al. |

OTHER PUBLICATIONS

Thomas R. Brown, et al., Pending U.S. Appl. No. 15/197,835 Entitled "Z/OS SMF/RMF Workload Data Playback with Web Dashboard Visualization" filed Jun. 30, 2016.

Thomas W. Conti, et al., Pending U.S. Appl. No. 15/197,833 Entitled "Run Time TPNS Workload Controls for Test Workload Tuning in Relation to Customer Profiling Workload" filed Jun. 30, 2016.

Thomas W. Conti, et al., Pending U.S. Appl. No. 15/197,844 Entitled "Run Time SMF/RMF Statistical Formula Methodology for Generating Enhanced Workload Data Points for Customer Profiling Visulization" filed Jun. 30, 2016.

Thomas W. Conti, et al., Pending U.S. Appl. No. 15/259,094 Entitled "Z/OS SMF Record Navigation Visualization Tooling" filed Sep. 8, 2016.

Thomas W. Conti, et al., Pending U.S. Appl. No. 15/259,104 Entitled "Using Customer Profiling and Analytics to Understand, Rank, Score, and Visualize Best Practices" filed Sep. 14, 2016.

Thomas W. Conti, et al., Pending U.S. Appl. No. 15/259,107 Entitled "Using Best Practices Customer Adoption Business Intellegence Data as Input to Enterprise Resource Planning (ERP)" filed Sep. 8, 2016.

Thomas W. Conti, et al., Pending U.S. Appl. No. 15/259,110 Entitled "Using Run Time and Historical Customer Profiling and Analytics to Determine Customer Test vs. Production Differences, and to Enhance Customer Test Effectiveness" filed Sep. 8, 2016.

Thomas W. Conti, et al., Pending U.S. Appl. No. 15/259,120 Entitled "Determining If Customer Characteristics by Customer Gography, Country, Culture or Industry May Be Further Applicable to a Wider Customer Set" filed Sep. 8, 2016.

Thomas W. Conti, et al., Pending U.S. Appl. No. 15/259,122 Entitled "Using Customer and Workload Profiling and Analytics to Determine Score, and Report Portability of Customer and Test Environments and Workloads" filed Sep. 8, 2016.

Thomas W. Conti, et al., Pending U.S. Appl. No. 15/259,124 Entitled "Using Customer Profiling and Analytics to Understand Customer Workload Complexity and Characteristics by Customer Geography, Country, and Cuture" filed Sep. 8, 2016.

Thomas W. Conti, et al., Pending U.S. Appl. No. 15/264,629 Entitled "Using Customer Profiling and Analytics to Create a Relative, Targeted, and Impactful Customer Profiling Environment/ Workload Questionnaire" filed Sep. 14, 2016.

Thomas W. Conti, et al., Pending U.S. Appl. No. 15/264,630 Entitled "Using Customer Workload Profiling and Analytics to understand and Visualize Customer Workload Execution" filed Sep. 14, 2016.

Thomas W. Conti, et al., Pending U.S. Appl. No. 15/264,631 Entitled "Using Run Time and Historical Customer Profiling and Analytics to Iteratively Design, Develop, Test, Tune, and Maintain a Customer-Like Test Workload" filed Sep. 14, 2016.

Thomas W. Conti, et al., Pending U.S. Appl. No. 15/264,632 Entitled "Using Customer Profiling and Analytics to More Accurately Estimate and Generate and Agile Bill of Requirements and Sprints for Customer or Test Workload Port" filed Sep. 14, 2016.

Thomas W. Conti, et al., Pending U.S. Appl. No. 15/264,634 Entitled "Standardizing Run-Time and Historical Customer and Test Environments and Workloads Comparisons Using Specific Sets of Key Platform Data Points" filed Sep. 14, 2016.

Thomas W. Conti, et al., Pending U.S. Appl. No. 15/264,638 Entitled "Using Run-Time and Historical Customer Profiling and Analytics to Determine and Score Customer Adoption Levels of Platform Technologies" filed Sep. 14, 2016.

Thomas W. Conti, et al., Pending U.S. Appl. No. 15/264,639 Entitled "Standardizing Customer and Test Data and Information Collection for Runtime and Historical Profiling Environments and Workload Comparisons" filed Sep. 14, 2016.

List of IBM Patents or Patent Applications Treated As Related (Appendix P), Filed Feb. 27, 2017, 2 pages.

Thomas R. Brown, et al., Pending U.S. Appl. No. 15/197,826 Entitled "Run Time Workload Threshold Alerts for Customer Profiling Visualization" filed Jun. 30, 2016.

(56) References Cited

OTHER PUBLICATIONS

Thomas R. Brown, et al., Pending U.S. Appl. No. 15/197,828 Entitled "Run Time and Historical Workload Report Scores for Customer Profiling Visualization" filed Jun. 30, 2016.
Thomas R. Brown, et al., Pending U.S. Appl. No. 15/424,971 Entitled "Run Time Workload Threshold Alerts for Customer Profiling Visualization" filed Feb. 6, 2017.
Thomas W. Conti, et al., Pending U.S. Appl. No. 15/197,827 Entitled "Run Time Test Workload Customer Profiling Baselines Visualization" filed Jun. 30, 2016.
Thomas W. Conti, et al., Pending U.S. Appl. No. 15/197,829 Entitled "Run Time Automatic Workload Tuning Using Customer Profiling Workload Comparison" filed Jun. 30, 2016.
Thomas W. Conti, et al., Pending U.S. Appl. No. 15/197,831 Entitled "Using Test Workload Run Facts and Problem Discovery Data as Input for Business Analytics to Determine Test Effectiveness" filed Jun. 30, 2016.
Thomas W. Conti, et al., Pending U.S. Appl. No. 15/197,843 Entitled "Visual Test Workload Execution Modeling" filed Jun. 30, 2016.
Thomas W. Conti, et al., Pending U.S. Appl. No. 15/259,099 Entitled "Measuring and Optimizing Test Resources and Test Coverage Effectiveness Through Run Time Customer Profiling and Analytics" filed Sep. 8, 2016.
Thomas W. Conti, et al., Pending U.S. Appl. No. 15/259,115 Entitled "Using Run Time and Historical Customer Profiling and Analytics to Determine Customer Disaster Recovery vs Production Differences, and to Enhance Customer Disaster Recovery Readiness and Effectiveness" filed Sep. 8, 2016.
Thomas W. Conti, et al., Pending U.S. Appl. No. 15/259,130 Entitled "Using Workload Profiling and Analytics and Score Complexity of Test Environments and Workloads" filed Sep. 8, 2016.
Thomas W. Conti, et al., Pending U.S. Appl. No. 15/259,168 Entitled "Using Customer Profiling and Analytics to Understand Customer Environment and Workload Complexity and Characteristics by Industry" filed Sep. 8, 2016.
Thomas W. Conti, et al., Pending U.S. Appl. No. 15/424,965 Entitled "Using Customer Profiling and Analytics to Understand Customer Environment and Workload Complexity and Characteristics by Industry" filed Feb. 6, 2017.
Thomas W. Conti, et al., Pending U.S. Appl. No. 15/424,973 Entitled "Run Time Test Workload Customer Profiling Baselines Visualization" filed Feb. 6, 2017.
Thomas W. Conti, et al., Pending U.S. Appl. No. 15/427,130 Entitled "Visual Test Workload Execution Modeling" filed Feb. 8, 2017.
Thomas W. Conti, et al., Pending U.S. Appl. No. 15/427,135 Entitled "Run Time Automatic Workload Tuning Using Customer Profiling Workload Comparison" filed Feb. 8, 2017.
Thomas W. Conti, et al., Pending U.S. Appl. No. 15/427,137 Entitled "Using Test Workload Run Facts and Problem Discovery Data as Input for Business Analytics to Determine Test Effectiveness" filed Feb. 8, 2017.
Thomas W. Conti, et al., Pending U.S. Appl. No. 15/429,262 Entitled "Measuring and Optimizing Test Resources and Test Coverage Effectiveness Through Run Time Customer Profiling and Analytics" filed Feb. 10, 2017.
Thomas W. Conti, et al., Pending U.S. Appl. No. 15/429,265 Entitled "Using Run Time and Historical Customer Profiling and Analytics to Determine Customer Disaster Recovery vs Production Differences, and to Enhance Customer Disaster Recovery Readiness and Effectiveness" filed Feb. 10, 2017.
Thomas W. Conti, et al., Pending U.S. Appl. No. 15/429,268 Entitled "Using Workload Profiling and Analytics and Score Complexity of Test Environments and Workloads" filed Feb. 10, 2017.
Dias, "Make the Azure Portal Dashboard your own", Nov. 30, 2015, 7 pages.
Yu, "Understanding User Behavior in Large-Scale Video-on-Demand Systems," Apr. 2006, ACM, pp. 333-344.

* cited by examiner

RUN TIME AND HISTORICAL WORKLOAD REPORT SCORES FOR CUSTOMER PROFILING VISUALIZATION

CROSS-REFERENCE TO RELATED APPLICATIONS

The present application is a continuation application of U.S. patent application Ser. No. 15/197,828 filed on Jun. 30, 2016, the contents of which are incorporated herein by reference.

BACKGROUND

The present invention relates to the testing of software, and more specifically, to a method, system and computer program product that implement aspects of workload and operational profiling, thereby resulting in improvements in the testing of customer software.

In the field of software testing, as in many other technical fields, improvements are constantly being sought, primarily for cost and accuracy reasons. A fundamental goal of software testing in theory is to identify all of the problems in a customer's software program before the program is released for use by the customer. However, in reality this is far from the case as typically a software program is released to the customer having some number of problems that were unidentified during the software development and testing process.

A relatively more proactive approach to improving software testing is sought that employs traditional methods of understanding characteristics of clients' environments, augmented with a process of data mining empirical systems data. Such client environment and workload profiling analysis may result in software test improvements based on characteristics comparisons between the client and the test environments.

SUMMARY

According to one or more embodiments of the present invention, a computer-implemented method includes caching, by a processor, historical data relating to a customer workload; and caching, by the processor, data relating to an active workload test. The method also includes determining, by the processor, one or more statistical measures between the historical data relating to a customer workload and the data relating to an active workload test; generating, by the processor, one or more workload report scores based on the statistical measures; and displaying, by the processor, the one or more workload report scores.

According to another embodiment of the present invention, a system includes a processor in communication with one or more types of memory, the processor configured to cache historical data relating to a customer workload; and to cache data relating to an active workload test. The processor is also configured to determine one or more statistical measures between the historical data relating to a customer workload and the data relating to an active workload test; to generate one or more workload report scores based on the statistical measures; and to display the one or more workload report scores.

According to yet another embodiment of the present invention, a computer program product includes a non-transitory storage medium readable by a processing circuit and storing instructions for execution by the processing circuit for performing a method that includes caching, by a processor, historical data relating to a customer workload; and caching, by the processor, data relating to an active workload test. The method also includes determining, by the processor, one or more statistical measures between the historical data relating to a customer workload and the data relating to an active workload test; generating, by the processor, one or more workload report scores based on the statistical measures; and displaying, by the processor, the one or more workload report scores.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
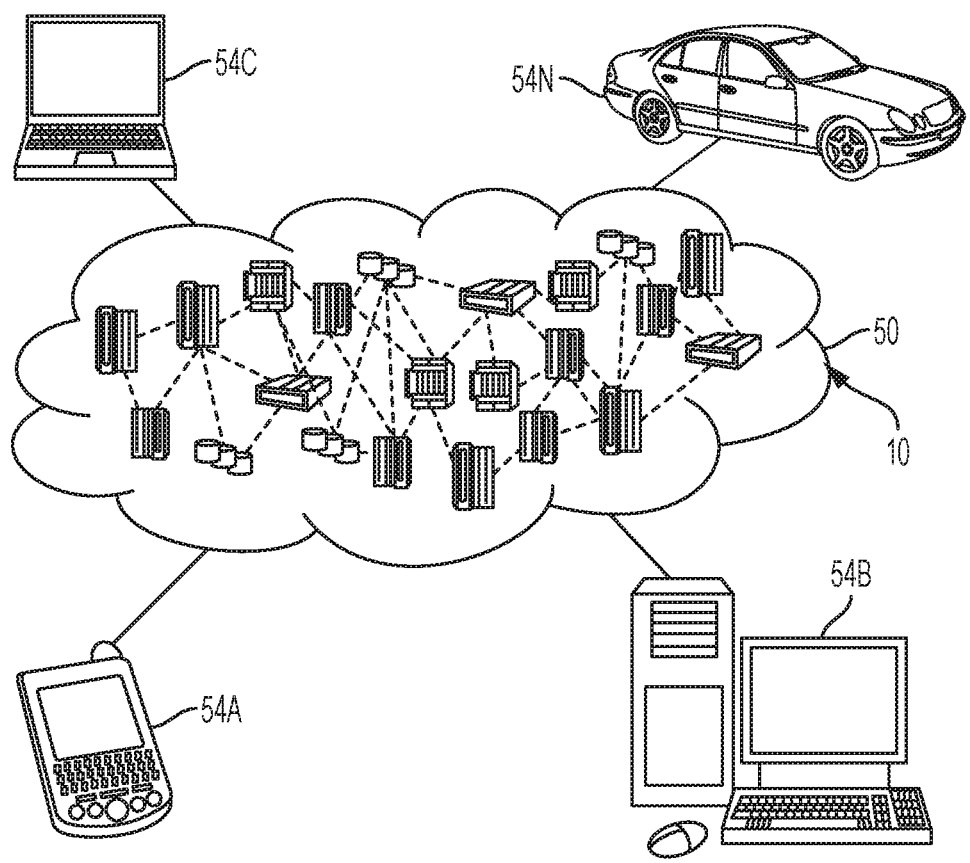
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
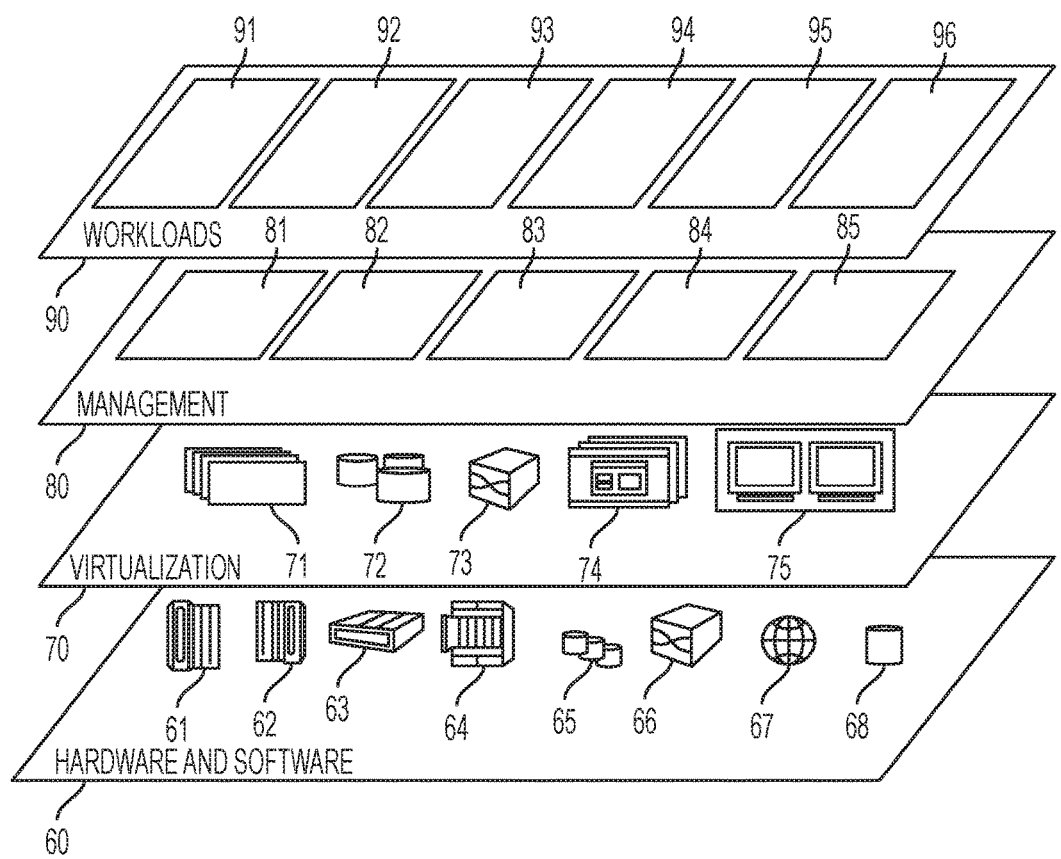
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for providing automated run time and historical test workload report scoring, in accordance with one or more embodiments of the present invention.

Figure 3:
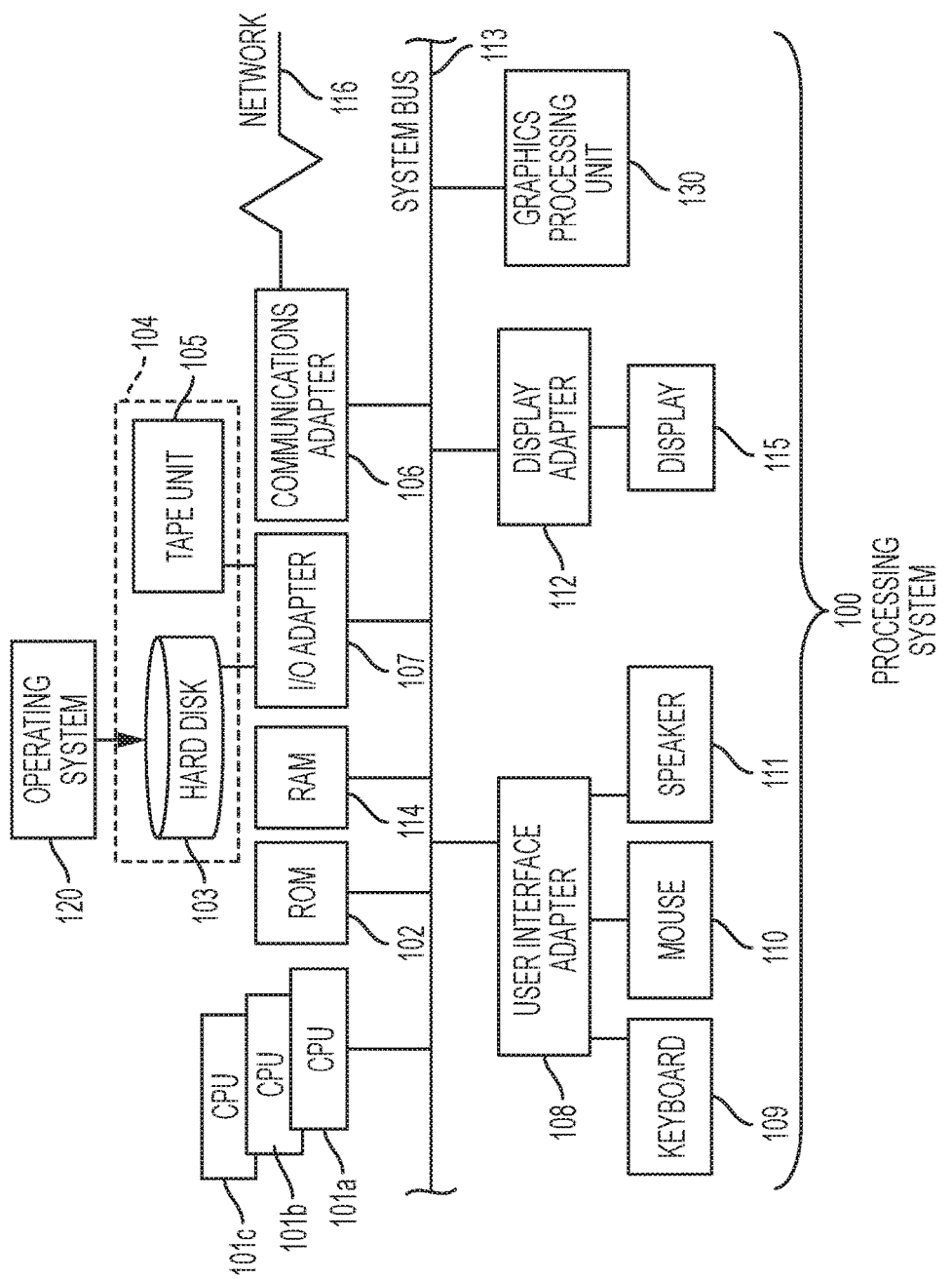
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed for providing automated run time and historical test workload report scoring.

One or more embodiments of the present invention provide a single page visualization of all data points grouped, for example, by Analysis Point ("AP"), Analysis Point Category ("APC"), and Analysis Point Group ("APG"), using available customer data which may, for example, be organized by industry. This provides the user with a way to look at all of the data on a single display screen diagram, rather than just one analysis point and its data points. This may be performed dynamically at run time and the scores and reports may also be stored in a database so that they can be viewed later during a post run time process.

In addition, one or more embodiments of the present invention may also bring external customer data and internal test data together so that both sets of data can have summary statistical measures calculated or determined and report scores identified and displayed. The statistics from both customer and test can then be compared for each statistical measure. The report view diagram reflects a user selection of customer data by customer, industry, industry maximum, etc. The report view diagram also allows for selection of the statistical measure scope for the current report view. All of the data to provide all of the run time views (customer or statistic) may be stored for post processing analysis and to provide for relatively fast refresh of the report visualization.

Exemplary embodiments of the present invention use a color score system that can have different numeric or character display values. The system is flexible such that a report may exist with the percent difference value, a 0.0 to 4.0 report card like values, ABCDF lettering also like a report card, or any other display value that would convey a passing or failing status to the user along with additional detail about level of passing or failing.

In various one or more embodiments of the present invention, automated run time test workload report scoring helps to continuously monitor the health and effectiveness of a running workload in comparison to a customer profiling workload, with the appropriate or required level of timely and necessary workload adjustment, through the application of minimal assessment effort. Run time report scoring significantly decreases delayed workload assessment and adjustment to close to run time (possibly in minutes), as opposed to a possibly significant time later in the workload run (potentially hours or even days) or even after the test workload run has completed.

Also, historical test workload report scores, which are run time test scores stored in a database (e.g., DB2) for later analytics, provide the capability to perform point-in-time analysis of the test workload for various post execution assessments of the test workload's effectiveness. This historical test workload report score time series data allows for relatively more granular assessment of test workload effectiveness than is traditionally performed, and allows for the relatively efficient determination as to whether a test workload (or any subset therefore) meets customer profiling workload criteria. By saving the calculated run time test scores in a database, exemplary embodiments leverage the run time systems resources employed, removing the need for post-workload run system resources to recalculate these report scores.

Given that test workload runs can be relatively complicated, resource and time intensive, limited in availability, and financially expensive to configure, stage, run, and analyze, and can span multiple days or even weeks (including non-user monitored off-shift and weekend time), providing a run time report scoring in accordance with one or more embodiments of the present invention for any number of key workload indicators can result in much more cost effective use.

The run time workload report scoring functionality of one or more embodiments of the present invention provides multiple capabilities, efficiencies, and financial benefits for the test user or operator including: (1) to understand the run time effectiveness of the workload (defined herein as including not only software but also hardware and firmware) run and what corrective run time adjustments may be required; (2) to tune test workloads much closer to their intended goal through the very nature of faster, run time notification and awareness. Intended goals may include emulating key characteristics of a customer workload environment or a test recreation or replication; (3) to significantly reduce the amount of limited and high value operating system systems, storage, network, environmental, personnel time and resources to accomplish test objectives, resulting in both financial savings and reduced environmental impact; and (4) to increase test plan efficiency through expanded test coverage, resulting in enhanced product quality and greater customer satisfaction. By the reduction of repeat test workload runs through higher individual workload run effectiveness, the test user or operator can run additional and/or expanded test cases or scenarios, and insure that each workload run maximizes a successful outcome.

Figure 4:
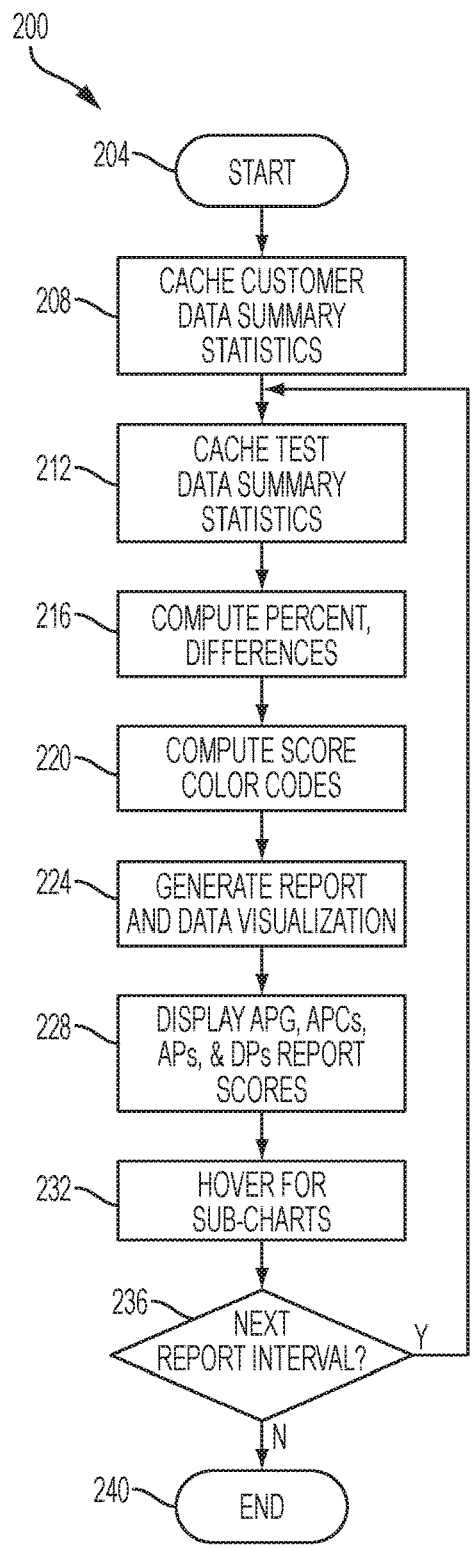
FIG. 4 is a flow diagram of a method for providing automated run time and historical test workload report scoring, in accordance with one or more embodiments of the present invention.

With reference now to FIG. 4, a flow diagram illustrates a method 200 according to one or more embodiments of the present invention for providing automated run time and historical test workload report scoring.

In one or more embodiments of the present invention, the method 200 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 100 described hereinabove and illustrated in FIG. 3, or in some other type of computing or processing environment.

The method 200 begins in a block 204, followed by a block 208 in which an operation caches or temporarily stores historical customer workload data summary statistics which have been previously stored in a database or other memory. These statistics may comprise various statistical measures, as described in more detail hereinafter.

In block 212, an operation is performed in which test data relating to the active or current test workload being performed is also cached or temporarily stored.

In block 216, various types of statistical measures between the historical customer workload data and the active test workload data are determined, calculated or computed. These exemplary statistical measures may include, for example and without limitation, ratios, percentages, and differences.

Figure 5:
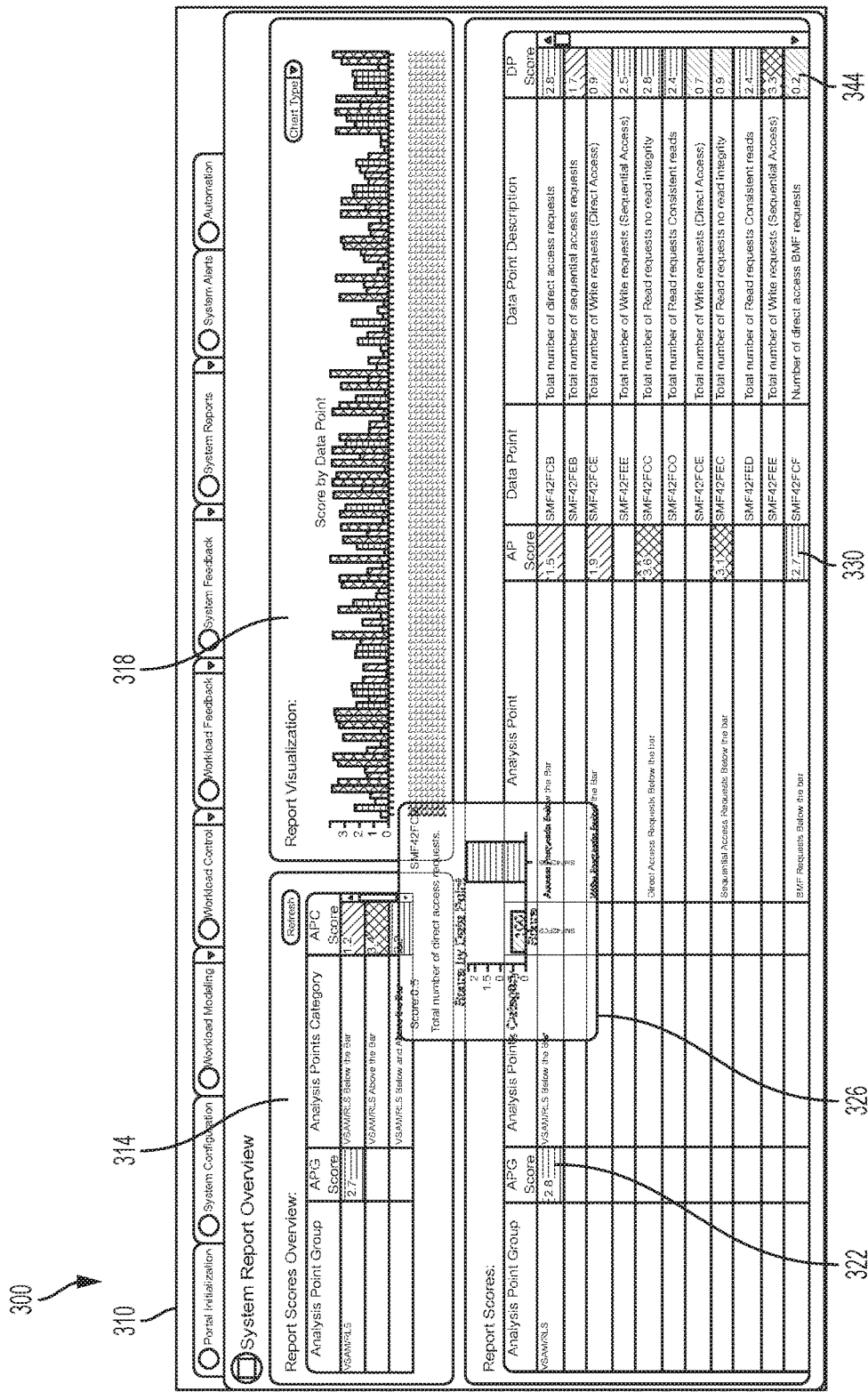
FIG. 5 is a visual diagram on a screen display of run time and historical test workload report scoring, in accordance with one or more embodiments of the present invention.

In block 220, the various determined statistical measures for some or all of the various data types, for example, Analysis Point ("AP"), Analysis Point Category ("APC"), and Analysis Point Group ("APG"), which represents both the historical customer workload data and the active test workload data, and which are used in embodiments of the present invention, may have corresponding color codes determined, calculated or computed. The color codes may vary by color depending upon the determined scores of the data points. In accordance with one or more embodiments of the present invention, these color coded data point scores may be displayed on a visual diagram 310 on a screen display 300 as shown in FIG. 5. Referring also to FIG. 5, there illustrated is the visual diagram 310 on the screen display 300 of run time and historical test workload report scoring, in accordance with one or more embodiments of the present invention In block 224, an operation is performed which generates various one or more report scores relating to run time test and historical customer workloads.

In block 228, an operation is performed which displays on the diagram 310 of FIG. 5 the determined values or scores of the various data point types—e.g., Analysis Point ("AP") scores 330, Analysis Point Category ("APC"), and Analysis Point Group ("APG") scores 322, along data point ("DP") scores 344 and the generated report scores in a "Report Scores Overview" 314. A "Report Visualization" 318 may also be provided which depicts scores by data points in the form of bar graphs.

The diagram 310 of FIG. 5 also allows for smaller sub-charts 326 to be displayed, for example, by allowing the sub-charts to hover within the overall larger diagram 310, in accordance with one or more embodiments of the present invention. This operation is carried out in block 232.

In block 236, an operation is performed which checks if additional active test data is available. If not, the method ends in block 240. If so, the method goes to the aforementioned block 212, which caches active test data.

In exemplary embodiments, the run time report scores may be calculated at any or all of the following workload levels, and visually presented in a diagram on a display screen for example through a variety of end-user customizable dashboard options, which include style, location, size, color, etc. These workload levels include, for example, the data point comprising the individual data point for a resource; the analysis point comprising grouped and/or related data points, a formula comprising pre-defined and/or user defined calculations, usually but not limited to simple mathematical equations and/or options (such as, variable weighting); functional comprising multiple data points, analysis points, and/or formulas for a related functional area; subsystem comprising multiple data points, analysis points, and/or formulas for a subsystem of a product; product comprising all functional areas within a "Product"—for example, all Catalog, CF, or DB2; system comprising system level; and total comprising total overall workload assessment, including across multiple systems.

In other embodiments, the customer profiling workload data selection or grouping comprises the customer profiling workload data selected for test workload data comparison and report card scoring. This data can vary from test workload to test workload, and may be specified using a relatively wide range of customer selection criteria including, for example and without limitation, any one or more of the following per workload run: customer; customer groups or groupings, councils, organizations, etc.; industry; geography; hardware, software, and/or firmware products and VRMF levels installed; APAR and/or PMR levels installed; server, storage, network environment and resource configuration; and other configuration criteria.

In various one or more embodiments of the present invention, the run time report score configuration controls may include, for example and without limitation, score types, which may be any of a number of options, including a percentage scale, 0-4 GPA, A-F grading structure, pass/fail, etc.; scoring criteria, which can be used to set percentage, real value, and/or other comparisons categories—for example, to set the percentage less than the customer at which the test workload is not competitive; content includes specification of the workload level(s) and customer profiling workload data selection or groupings; design/layout which comprises specification of the report card layout including hierarchy of data variables display, font sizes, charts, graphs, etc.; and color coding in which multiple color coding options provide the test user with the ability to determine the granularity of the test scores, as well as for personal, cultural, and other preferences. As an example of color coding, yellow may be used for when the test workload value is less than −10% within the customer value; white may be used for when the test workload value is between −10% and 10% of the customer value; and green may be used when the test workload value is greater than 10% of the customer value.

Still other one or more embodiments of the present invention involve run time alert notification integration. This run time workload report scoring functionality can be integrated with a run time threshold alert functionality, to provide the capability to actively alert the test user to a wide range of test workload reports scores, including for example and without limitation, underperforming report scores; meeting or exceeding target report scores; outstanding report scores; and excessive report scores.

Thus, one or more embodiments of the present invention provide automated run time and historical test workload report scoring when comparing historical customer profiling workload run data to active test workload run data. This functionality provides automated run time report card and historical report card scoring for targeted workload run components in comparison to a wide range of historical customer workload data, as specified by the test workload user or operator.

In other exemplary embodiments, a customer profiling baselines visualization may utilize existing customer data coupled with the live collection of test data, and store this data in a database. The data may be used in a web application to visually represent the levels of load and stress and ratios of activity for sets of related data points. As an additional, integrated feature of this customer profiling baselines visualization web application, highly customizable report scores (including a wide range of selection, weighting, and formula computational criteria) can be configured at any of the different workload levels.

The run time workload report scores calculated for any of these different workload levels may be stored in the customer profiling baselines visualization database and can be retrieved for later comparisons of customer and/or test workloads. Run time score retention in the customer profiling baselines visualization database also provides analytics on the consistency, variability, scalability, availability, reliability, and other expected and unexpected behaviors of individual and collective workload runs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
storing, by a processor, historical data relating to a customer workload;
storing, by the processor based on the live collection of test data, data relating to an active workload test;
determining, by the processor, one or more statistical measures between the historical data relating to the customer workload and the data relating to the active workload test;
generating, by the processor, one or more workload report scores based on the statistical measures;
generating one or more alerts in response to the one or more workload report scores meeting or exceeding a target report score, underperforming workload report scores, or excessive workload report scores; and
displaying, by the processor, the one or more workload report scores and the one or more alerts in a single page visualization, wherein the display is performed dynamically during run time of the active workload test.

2. The computer-implemented method of claim 1 wherein the one or more statistical measures between the historical data relating to the customer workload and the data relating to the active workload test is selected from the group consisting of ratios, percentages, and differences.

3. The computer-implemented method of claim 1 wherein the historical data relating to the customer workload comprises data stored in a database.

4. The computer-implemented method of claim 1 wherein the historical data and the data relating to the active workload test comprise analysis point data, analysis point category data, and analysis point group data.

5. The computer-implemented method of claim 1 further comprising determining, by the processor, corresponding color codes for one or more statistical measures between the historical data relating to the customer workload and the data relating to the active workload test; and displaying, by the processor, the one or more workload report scores in the corresponding color codes.

6. The computer-implemented method of claim 1 wherein displaying, by the processor, the one or more workload report scores comprises displaying, by the processor, a sub-chart of information relating to the one or more workload report scores.

7. The computer-implemented method of claim 1 wherein the one or more workload report scores comprise at least one type of grading score.

\* \* \* \* \*